(12) United States Patent
Hiranuma et al.

(10) Patent No.: US 6,634,170 B2
(45) Date of Patent: Oct. 21, 2003

(54) EXHAUST EMISSION CONTROL SYSTEM OF INTERNAL COMBUSTION ENGINE

(75) Inventors: Satoshi Hiranuma, Tochigi (JP); Kihoko Kaita, Saitama (JP); Shinichi Saito, Tochigi (JP); Takeshi Hashizume, Tochigi (JP); Junya Watanabe, Tochigi (JP); Kenji Kawai, Tochigi (JP); Toru Kawatani, Tochigi (JP); Yoshinaka Takeda, Kanagawa (JP)

(73) Assignee: Mitsubishi Fuso Truck and Bus Corporation, Tokyo (JP)

( * ) Notice: Subject to any disclaimer, the term of this patent is extended or adjusted under 35 U.S.C. 154(b) by 0 days.

(21) Appl. No.: 10/106,223

(22) Filed: Mar. 27, 2002

(65) Prior Publication Data

US 2002/0157386 A1 Oct. 31, 2002

(30) Foreign Application Priority Data

Mar. 27, 2001 (JP) .................................... 2001-090808

(51) Int. Cl.$^7$ ................................................ F01N 3/00
(52) U.S. Cl. ............................ 60/295; 60/274; 60/286; 60/297; 60/311; 123/443
(58) Field of Search ........................ 60/274, 276, 285, 60/286, 295, 297, 311; 123/443

(56) References Cited

U.S. PATENT DOCUMENTS

| 5,063,736 | A | * | 11/1991 | Hough et al. .................. 60/286 |
| 6,041,591 | A | * | 3/2000 | Kaneko et al. ................ 60/274 |
| 6,116,021 | A | * | 9/2000 | Schumacher et al. ......... 60/274 |
| 6,167,696 | B1 | * | 1/2001 | Maaseidvaag et al. ........ 60/274 |
| 6,289,673 | B1 | * | 9/2001 | Tayama et al. ................ 60/285 |
| 6,336,320 | B1 | * | 1/2002 | Tanaka et al. ................. 60/285 |

FOREIGN PATENT DOCUMENTS

| JP | 61-79814 A | 4/1986 |
| JP | 4-47119 A | 2/1992 |

* cited by examiner

*Primary Examiner*—Thomas Denion
*Assistant Examiner*—Binh Tran
(74) *Attorney, Agent, or Firm*—Birch, Stewart, Kolasch & Birch, LLP

(57) ABSTRACT

An exhaust emission control system of an internal combustion engine is provided which controls the oxygen concentration of exhaust passing through the exhaust emission control device according to the flow rate of exhaust flowing through an exhaust passage when the exhaust emission control device is regenerated, so that the regeneration is completed within a short period of time while the filter is prevented from being damaged by melting during the regeneration. This improves the exhaust emission control performance and reliability of the filter.

8 Claims, 3 Drawing Sheets

EXHAUST EMISSION CONTROL SYSTEM OF INTERNAL COMBUSTION ENGINE

BACKGROUND OF THE INVENTION

This non-provisional application claims priority under 35 U.S.C. §119(a) on Patent Application No. 2001-90808 filed in Japan on Mar. 27, 2001, which is herein incorporated by reference.

1. Field of the Invention

This invention relates to an exhaust emission control system of an internal combustion engine having a function of regenerating an exhaust emission control device capable of trapping harmful matters included in exhaust.

2. Description of Related Art

Examples of prior art relating to such an exhaust emission control device are disclosed in Japanese Laid-Open Patent Publications Nos. 4-47119, 61-79814 and the like.

The exhaust emission control system disclosed in the Japanese Laid Open Patent Publication No. 4-47119 supplies fuel into an exhaust passage at a position upstream of a filter, and regenerates the filter by oxidizing particulate matters deposited on the filter by means of combustion heat of the fuel. In particular, this exhaust treatment system provides control such that the quantity of fuel to be supplied is increased with an increase in the oxygen flow in the exhaust and decreased with a rise in the exhaust temperature. Thus, this exhaust treatment device enables the combination temperature of the supplied fuel to reach a predetermined temperature during regeneration of the filter, so that the particulate matters can be oxidized without overheating the filter.

On the other hand, the exhaust treatment system disclosed in Japanese Laid-Open Patent Publication No. 61-79814 heats a filter by means of an external heat source such as an electric heater, and oxidizes particulate matters by resulting heat. In particular, if an engine starts idling during regeneration of the filter, this exhaust treatment system provides control such that the oxygen concentration is controlled to be equal to or lower than a predetermined upper limit in the case where the temperature of the filter exceeds a predetermined temperature and the oxygen concentration of exhaust exceeds the predetermined upper limit. Thus, this exhaust treatment system is able to prevent the filter from overheating due to the rapid oxidization of the filter even if the filter is sufficiently heated with a small amount of particulate filters being deposited thereon.

Although the above-mentioned exhaust treatment system disclosed in the Japanese Laid-Open Patent Publication No. 4-47119 decreases the quantity of fuel to be supplied with a rise in the exhaust temperature during the regeneration of the filter, the system merely sets the combustion temperature of the fuel to a predetermined value without taking into consideration the overheat of the filter due to the combustion of the particulate matters. Specifically, even if the combustion temperature of the fuel is maintained at a predetermined value during the regeneration of the filter, the filter may be damaged by melting due to the combustion heat of the fuel in the case where the particulate matters are rapidly combusted.

On the other hand, the exhaust treatment system disclosed in the Japanese Patent Laid-Open Publication No. 61-79814 controls the oxygen concentration to be equal to or lower than the predetermined upper limit (e.g. 4%) to thus prevent the rapid combustion of the fuel. However, the combustion proceeds slowly while the oxygen concentration is low, and therefore, it takes a long period of time to regenerate the filter.

SUMMARY OF THE INVENTION

It is therefore an object of the present invention to provide an exhaust emission control system of an internal combustion engine, which is capable of preventing the exhaust emission control device from being damaged by melting due to overheating during regeneration, and reducing the time required for regenerating the exhaust emission control device.

To accomplish the above object, an exhaust emission control device of an internal combustion engine includes an exhaust emission control device disposed in an exhaust passage of the internal combustion engine and is capable of trapping harmful matters in exhaust, an exhaust flow rate detecting device that detects a flow rate of exhaust flowing through the exhaust passage, and a concentration control device that exhaust emission control device according to the flow rate of the exhaust when the exhaust emission control device is regenerated.

Usually, as the combustion of harmful matters such as particulate matters proceeds during regeneration of an exhaust emission control device such as a filter, the exhaust emission control device temperature is raised by heat resulting from the combustion. If the combustion further proceeds, the exhaust emission control device may be damaged by melting due to an excessive rise in the temperature although the time required for regeneration is reduced. However, if the combustion proceeds slowly, it takes a long time to regenerate the filter.

Thus, there is a trade-off relationship between prevention of the exhaust emission control device from melting and reduction of the time required for regeneration. The exhaust emission control system effective for attaining these objects has been developed with removal of heat by an exhaust flow in mind. More specifically, even in the case where the particulate matters are actively combusted during the regeneration of the exhaust emission control device, if the flow rate of exhaust passing through the exhaust emission control device is high, the exhaust flow accordingly removes a large amount of heat to prevent the temperature of the filter from rising excessively. On the other hand, if the flow rate of exhaust is low, the exhaust flow removes only a small amount of heat, and in is therefore necessary to control the combustion of the particulate matters in order to prevent the exhaust emission control device from overheating. Therefore, with the relevancy of the exhaust flow rate to the amount of removed heat in mind, the exhaust emission control device according to the present invention actively controls the oxygen concentration according to the detected exhaust flow rate to thereby control the degree to which the combustion of the particulate matters proceeds with in such a range as not to overheat the exhaust emission control device.

Since the regeneration of the exhaust emission control device is completed within a short period of time while preventing the filter from being damaged by melting, the exhaust emission control performance and reliability of the exhaust emission control device are considerably improved.

BRIEF DESCRIPTION OF DRAWINGS

The name of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Figure 1:
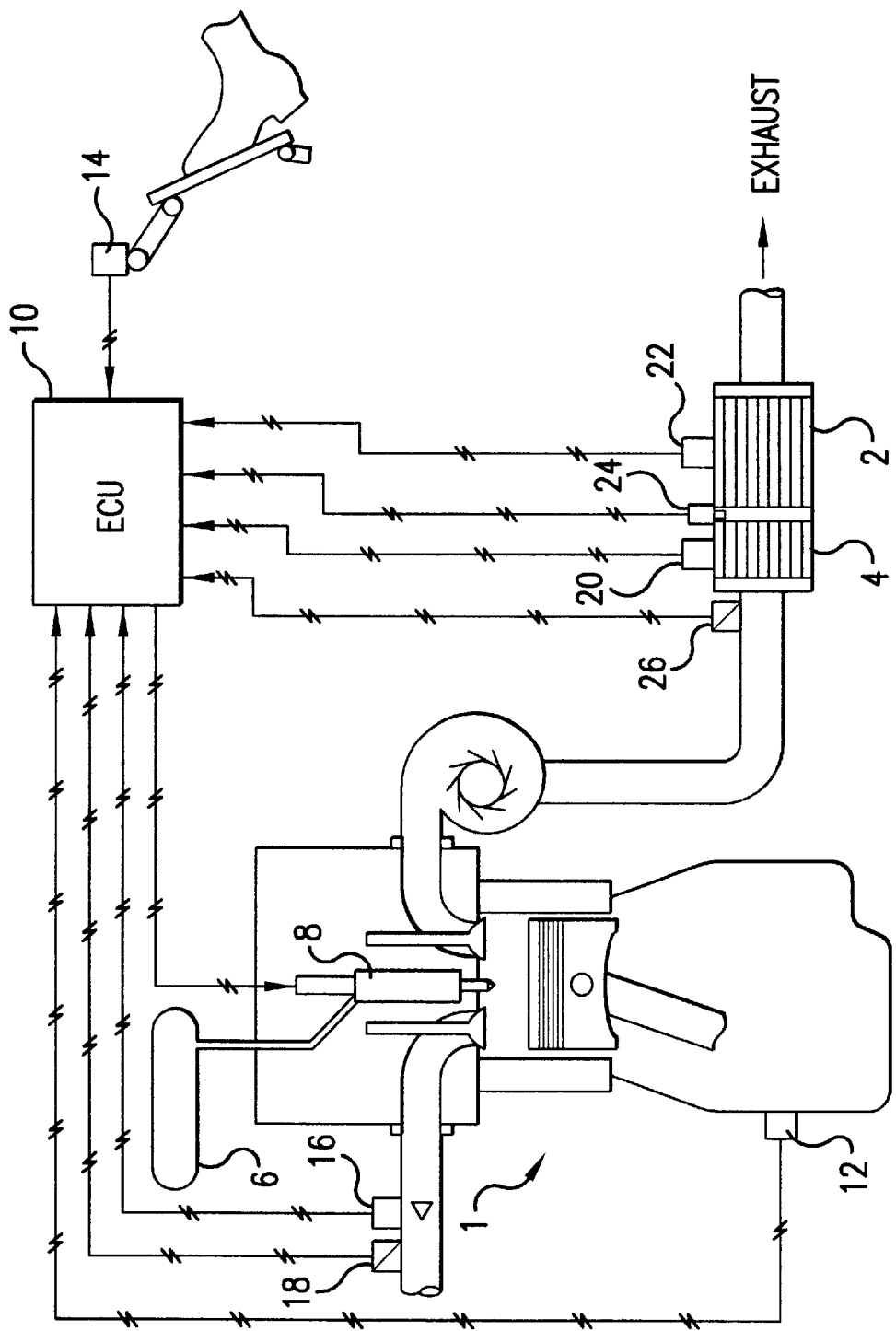
FIG. 1 is a schematic diagram showing an exhaust emission control device according to an embodiment of the present invention.

A preferred embodiment of the present invention will now be described in detail with reference to the accompanying drawings. FIG. 1 illustrates an exhaust emission control system according to the embodiment of the present invention, which is applied to a diesel engine, for example. A diesel particulate filter (hereinafter referred to as "DPF") 2 serving as an exhaust emission control device is disposed in an exhaust passage of an engine 1, and an oxidization catalyst 4 is disposed upstream the DPF 2. The DPF 2 has a function of trapping particulate matters included in exhaust passing there through to control exhaust emission, and oxidizing the trapped particulate matters so that the DPF 2 can be regenerated continuously.

A so-called common rail system is adopted as a fuel supply system of the engine 1. The common rail system includes a common rail 6, a fuel injector 8, and an electronic control unit (hereinafter referred to as "ECU") 10, for example. High-pressure fuel is supplied from a fuel tank via a high-pressure fuel supply pump (both of which are not illustrated in the drawings) and is accumulated in the common rail 6. The ECU 10 outputs an operation signal to the fuel injector 8 so as to cause the fuel injector 8 to open and close an injection valve thereof for injection of fuel. The ECU 10 controls the fuel injection quantity and the injection timing according to an operating state of the engine (engine speed, load, etc.), for example. Accordingly, the ECU 10 has a function of controlling fuel injection, which is programmed in advance in order to properly carry out the main injection.

The exhaust emission control according to the present invention can be realized by using the above-described common rail system. The ECU 10 of the common rail system also has a function of carrying out post injection of fuel during a stroke after the main injection (expansion or exhaust stroke), so that the post injection can raise the exhaust temperature and the filter temperature during regeneration of he DPF 2. In particular, the exhaust emission control device according to the present invention is capable of providing control such that fuel is mixed in exhaust by the post injection to specifically increase or decrease the oxygen concentration of the fuel.

To provide accurate control, the ECU 10 collects a variety of information from a variety of sensors disposed in various parts of the engine 1. More specifically, the ECU 8 receives a sensor signal from a crank angle sensor 12, and detects the engine speed Ne, crank angle CA, etc. of the engine 1 by operation of the sensor signal. The ECU 10 also receives a sensor signal from an accelerator position sensor 14 to detect the accelerator angle Acc based on the depression of an accelerator by a driver.

Further, the ECU 10 receives sensor signals from an air flow sensor 16 and temperature/pressure sensor 18 disposed in an intake passage of the engine 1, and detects the intake air flow and the intake temperature/pressure by operation of the sensor signals. On the other hand, the ECU 10 receives sensor signals from temperature sensors 20 and 22 provided in the DPF 2 and the oxidization catalyst, respectively, and detects the filter temperature and the catalyst temperature or the atmosphere temperature relating to the filter and the catalyst by operation of the sensor signals. Further, the ECU 10 receives a sensor signal from an oxygen concentration sensor 24 disposed between the oxidization catalyst 4 and the DPF 2, and detects the oxygen concentration of exhaust passing through the DPF 2 by operation of the sensor signal. Further, the ECU 10 receives a sensor signal from a temperature/pressure sensor 26 disposed in the exhaust passage, and detects the exhaust temperature and pressure by operation of the sensor signal.

According to the present embodiment, the exhaust emission control device according to the present invention is applied to the diesel engine for vehicles. According to the present embodiment, the exhaust emission control device is capable of providing regeneration control of the DPF 2 by means of the common rail system. The filter regeneration control provided by the exhaust emission control device will now be described by way of examples.

Figure 2:
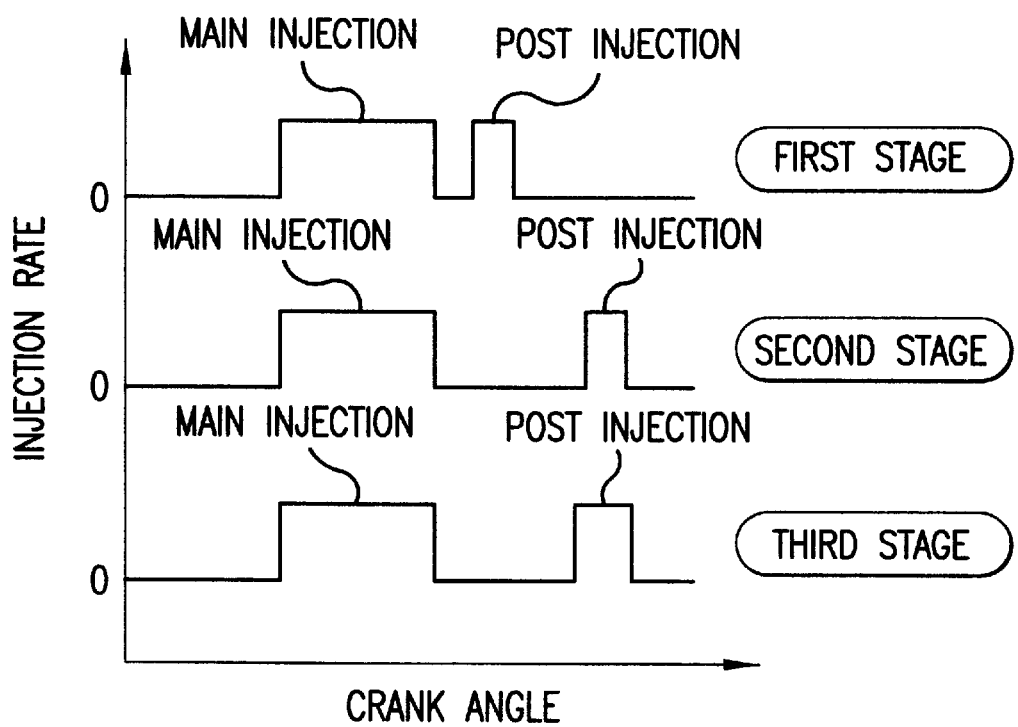
FIG. 2 is a diagram showing an example of a fuel injection pattern during regeneration of a filter.

FIG. 2 illustrates an example of a fuel injection pattern during the filter regeneration control. In the present embodiment, for example, a three-stage injection pattern is set for regeneration of the filter, and the injection pattern shifts from the first to third stage in a sequential order with the progress of the filter reintegration control.

First, in the injection pattern at the first stage, the post injection of fuel is carried out in the expansion stroke after the main injection, and the exhaust temperature is then raised by combustion heat of the fuel. On this occasion, the ECU 10 sets the target injection quantity and injection timing that enable efficient rise in the exhaust temperature, and controls the fuel injection quantity and the injection timing in the post injection according to the set target values. For example, the target values can be set with reference to a predetermined map according to information representing the engine speed Ne and the accelerator angle Acc (load)

If the oxidization catalyst 4 has reached an activation temperature (e.g. 300° C. or higher) due to the rise in the exhaust temperature, the injection pattern shifts to the second stage. The injection pattern at the second stage is intended to generate unburned HC in the exhaust by the post injection, and supply the generated HC to the oxidization catalyst 4 for oxidization. The oxidization of HC raises the inlet temperature if the DPF 2 to satisfy the temperature conditions that enable regeneration of the DPF 2.

Specifically, the ECU 10 monitors a change in the temperature of the oxidization catalyst 4 by means of the sensor signal from the temperature sensor 20. When checking that the temperature of the oxidization catalyst 4 has been stabilized at the activation temperature, the ECU 10 changes the post injection timing and the post injection quantity. On this occasion, the ECU 10 sets the post injection start timing at a later point than the post injection start timing at the first stage, and mixes the fuel supplied by the post injection in the exhaust without oxidizing it. The fuel injected in the post injection is vaporized in the exhaust to generate unburned HC gas.

If the temperature of the DPF 2 has been raised to a regeneration enabling temperature, the particulate matters are ignited to start combustion (regeneration device). Thus, the temperature of the DPF 2 is raised to the regeneration enabling temperature (e.g. the outlet temperature of 600° C. or higher). If such temperature conditions are maintained for a predetermined period of time (e.g. ten minutes), the injection pattern of the exhaust emission control system shifts to the third stage. The ECU 10 monitors the temperature of the DPF w by means of a sensor signal from the temperature sensor 22. When checking that the temperature is kept at the regeneration enabling temperature for a predetermined period of time, the ECU 10 changes the post injection timing and the injection quantity correspondingly to the injection pattern at the third stage.

The injection pattern at the third stage is also intended to mix unburned HC in the exhaust, but an object of the injection pattern at the third stage is to control the oxygen concentration of the exhaust passing through the DPF 2. The oxygen concentration can be controlled by the post injection in a manner described hereinbelow. For example, the target oxygen concentration is set in advance and the actual oxygen concentration is then detected, and the fuel injection quantity is regulated according to a difference between the target oxygen concentration and the actual oxygen concentration. The actual oxygen concentration maybe detected using the above-mentioned oxygen concentration sensor 24, or may be calculated from the over air flow rate according to information such as the detected intake air flow and the main injection quantity that should be controlled in the common rail system. Thus, by finding a deviation of the actual oxygen concentration from the target oxygen concentration, the injection quantity of the fuel to be mixed in the exhaust can be easily found from the over air flow rate by reverse operation.

The above-mentioned target oxygen concentration can be set according to the flow of the exhaust passing through the DPF 2. Accordingly, the ECU 10 has a function of detecting the exhaust flow rate and setting the target oxygen concentration according to the detected exhaust flow rate. The exhaust flow rate can be detected in the following manner, for example. The ECU 10 finds the volumetric efficiency with reference to a predetermined map according to the information such as the engine speed Ne and the accelerator angle (load) Acc representing the operating state of the engine 1, and calculates the exhaust flow rate according to the information such as the found volumetric efficiency, the engine speed Ne and detected intake temperature/pressure (exhaust flow rate detecting device). The map of the volumetric efficiency is stored in a storage of the ECU 10, and the intake temperature/pressure can be detected using the above-mentioned temperature/pressure sensor 18.

Alternatively, the ECU 10 may detect the intake air flow and the intake temperature/pressure sensor 18, and detect the exhaust temperature and pressure by means of the temperature sensor 20 provided in the oxidization catalyst 4 and the temperature sensor 20 sensor 26 disposed in the exhaust passage. The ECU 10 may calculate the exhaust flow rate based on the detected values (exhaust flow rate detecting device).

Upon detection of the exhaust flow rate, the ECU 10 sets the target oxygen concentration based on the detected exhaust flow rate. On this occasion, according to a relationship between the amount of heat removed by the exhaust flow and a value of heating by combustion of particulate matters, a specific value of the target oxygen concentration is set in advance to such a value as to control combustion of particulate matters such that the temperature of the DPF 2 never exceeds a predetermined allowable value.

Figure 3:
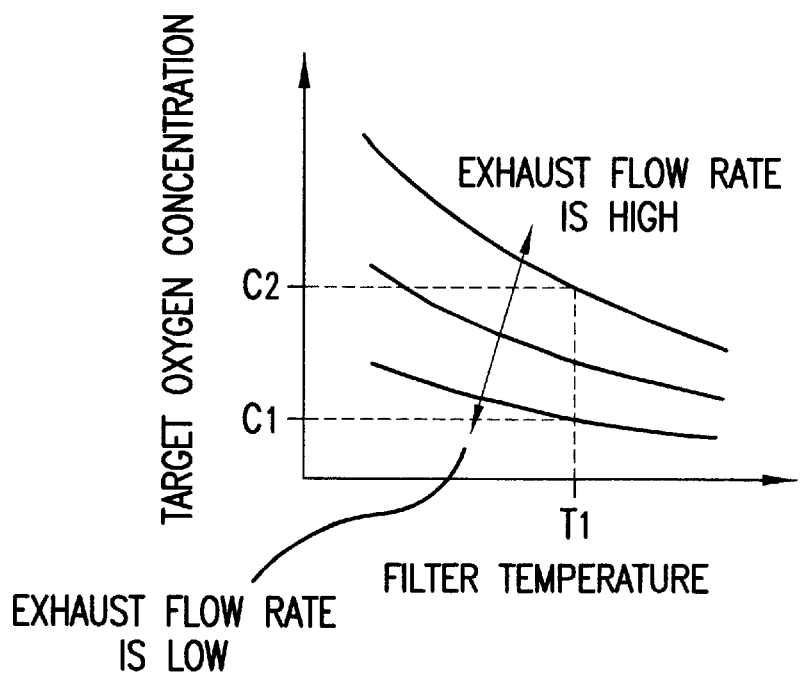
FIG. 3 is a diagram showing a relationship between the filter temperature and the target oxygen concentration during control of the oxygen concentration according to the embodiment.

FIG. 3 shows a relationship between the target oxygen concentration and the filter temperature during regeneration of the filter. Assuming that the filter temperature lies inside an allowable range within which the DPF is never damaged by melting, the target oxygen concentration may be set to a larger value (C2>C1) if the exhaust flow rate is high under the same temperature conditions (e.g. T1). This is because the DPF is never overheated even if the particulate matters are actively combusted due to the high oxygen concentration (C2−C1), since an increasing amount of heat is removed from the DPF 2 with a rise in the flow rate of the exhaust passing through the DPF 2.

Figure 4:
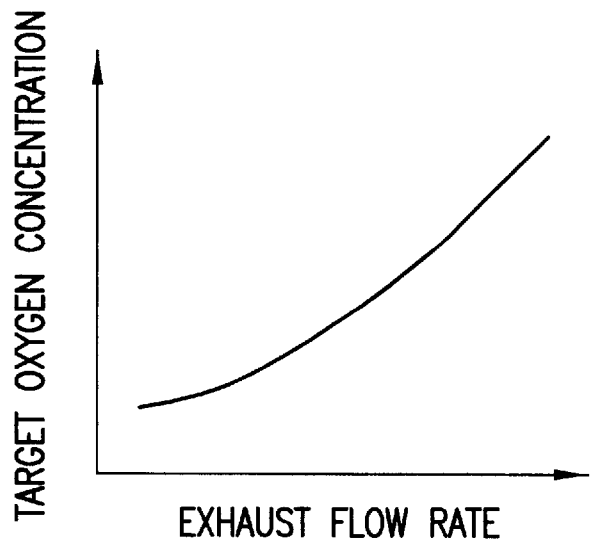
FIG. 4 is a diagram summarizing the relationship in FIG. 3 by way of a relationship between the exhaust flow rate and the target oxygen concentration.

FIG. 4 shows an example of a map for setting the target oxygen concentration according to the detected exhaust flow rate. A relationship between the exhaust flow rate and the target oxygen concentration can be set simply as shown in FIG. 4 according to the relationship between the target oxygen concentration and the filter temperature. Specifically, if the target oxygen concentration is set within such a range as not to damage the DPF 2 by melting, the value of the target oxygen concentration is determined based on the exhaust flow rate, and the map exhibits such characteristics that a higher target oxygen concentration is set with respect to a higher exhaust flow rate. It should be noted that specific values of the exhaust flow rate and oxygen concentration may be determined properly according to the specifications and the like of the engine 1 and DPF 2 to which should be applied the present invention.

In the actual filter regeneration control, for example, the ECU 10 detects the filter temperature and the exhaust flow rate, and searches the map shown in FIG. 3 according to the detected values to set the target oxygen concentration. Originally, the target oxygen concentration is preferably set to an exact value according to the present filter temperature and exhaust flow rate, but the target oxygen concentration may be simply set according to the exhaust flow rate only with reference to the map in FIG. 4. Upon setting of the target oxygen concentration, the post injection quantity can be calculated from the set target oxygen concentration in the above-described manner. According to the calculated post injection quantity, the ECU 10 operates the injector 8 to mix the fuel in the exhaust and control the oxygen concentration of the fuel (concentration control device).

The inventors, etc. of the present invention have proposed another concentration control device that implements a more practical concentration control method. When actually controlling the exhaust oxygen concentration according to the relationship as shown in FIGS. 2 and 4 for example, the exhaust flow rate may be replaced by another state variable in order to set the actual post injection quantity. More specifically, the exhaust flow rate is determined according to the engine speed Ne and the accelerator angle (load) Acc with reference to a map for determining the post injection quantity according to the engine speed Ne and the accelerator angle Acc. In this concentration control method, the exhaust flow rate as a physical quantity is not detected, but the exhaust flow rate is replaced by another state variable (e.g. engine speed and load) so that the exhaust flow rate can be observed by way of the state variable. The target oxygen concentration is converted into the post injection quantity according to the result of the observation. Therefore, this control method has the advantage of determining the post injection quantity directly according to the operating state such as the engine speed and the load.

To implement the above-described control method, a post injection quantity control map for finding the target oxygen concentration correspondingly to each operating state (e.g. engine speed and load) may be incorporated into the ECU 10. The map shows a relationship the operating state of the engine 1 and the post injection quantity, which replaces the relationship between the exhaust flow rate and the target oxygen concentration. Therefore, only by searching the map according to the detected operating state and carrying out the post injection according to the search result, the ECU 10 can easily achieve the target oxygen concentration determined according to the exhaust flow rate (exhaust flow rate detecting device, concentration control device).

Figure 5:
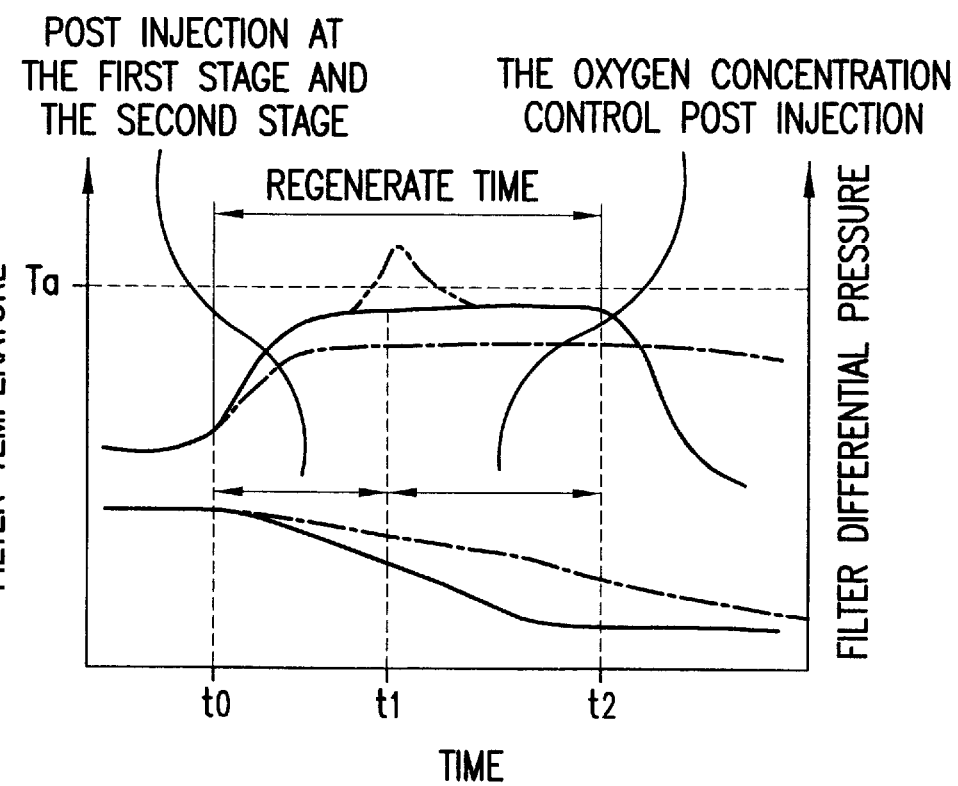
FIG. 5 is a diagram showing temporal changes in the filter temperature and the filter differential pressure with execution of the filter regeneration control routine.

FIG. 5 shows a change in the temperature of the DPF 2 and a change in pressure difference between the inlet and outlet of the DPF 2 (filter differential pressure). If the post injection of fuel is carried out in the injection pattern at the first stage after the start of the filter regeneration control, the filter temperature is raised from a starting point of the post injection (time t0). Carrying out the post injection in the injection pattern at the second stage starts combusting the particulate matters, and the oxygen concentration is controlled for a period of time in which the post injection in the injection pattern at the third stage is carried out (time t1 to t2). During this period, the filter temperature is controlled to be equal to or smaller than an allowable value Ta at which the filter can be prevented from being damaged by melting, and the filter temperature changes in a stable manner.

If the post injection is stopped after the start of the combustion of the particulate matters as is the case with the prior art to continue the low speed and low load operation for example, the combustion of the particulate matters rapidly progresses. As a result, the filter temperature may exceed the allowable Ta at a certain point in time as indicated by a two-dot chain line in FIG. 5. This is because the combustion of the particulate matters on the DPF 2 rapidly progresses due to the transmission of flame.

If the particulate matters are slowly combusted with a rise in the filter temperature being controlled as indicated by a one-dot chain line in FIG. 5, for example, as is case with the prior art, it takes a long time to regenerate the filter since the filter differential pressure is not eliminated for a long period of time.

To the contrary, according to the present embodiment, the oxygen concentration is controlled according to the exhaust flow rate in the above-mentioned period of time (time t1 to t2). Therefore, even if the particulate matters are actively combusted, the heat resulting from the combustion is removed by the exhaust flow, or if only a small amount of heat is removed by the exhaust heat, the particulate matters are combusted slowly, and this prevents the filter from overheating. Consequently, the filter temperature never exceeds the allowable value Ta, and the time required for regeneration of the filter (time t0 to t2) is relatively reduced. The extended period of time required for regeneration increases the post injection quantity per regeneration cycle to deteriorate the fuel economy.

Although in the above-described embodiment, the injection pattern shifts from the first to third stage according to the temperature conditions such as the oxidization catalyst 4 and the DPF 2, the injection pattern may shift according to the elapse of time from the start of each injection pattern. The injection patterns are only preferred examples, and the fuel injection patterns during the regeneration of the filter should not be restricted to these shown in FIG. 2.

To exactly detect the temperature conditions such as the oxidization catalyst 4 and the DPF 2 to carry out the post injection, the specific arrangement and number of the sensors in FIG. 1 may be changed.

Although in the above-described embodiment, the temperature of the DPF 2 is raised by the post injection during the regeneration of the filter, the temperature of the DPF 2 may be raised by means of an external heat source such as an electric heater.

Further, the common rail system, the variety of sensors, and others mentioned in the above-described embodiment may be modified according to the form, specification, etc. of an internal combustion engine to which is applied the exhaust emission control system according to the present invention.

What is claimed is:

1. An exhaust emission control system of an internal combustion engine, comprising:

a diesel particulate filter disposed in an exhaust passage of the internal combustion engine and trapping diesel particulates in exhaust;

an exhaust flow rate detecting device that detects a flow rate of the exhaust flowing through the exhaust passage; and a concentration control device that controls an oxygen concentration of the exhaust passing through said exhaust emission control device according to the detected flow rate of the exhaust, said concentration control device reducing the amount of oxygen concentration to increase an amount of unburned hydro-carbon (HC) in the exhaust to burn the trapped diesel particulates, and adjusting the amount of oxygen concentration thereafter to prevent said diesel particulate filter from overheating.

2. An exhaust emission control system of an internal combustion engine according to claim 1, wherein said concentration control device provides control such that the oxygen concentration is set to a larger value with respect to a higher flow rate of the exhaust.

3. An exhaust emission control device of an internal combustion engine according to claim 1, further comprising:

a fuel injection valve that carries out sub injection of additional fuel in a strode after main injection of fuel into a combustion chamber of the internal combustion engine, wherein said concentration control device control device controls the oxygen concentration by regulating a quantity of the fuel injected in the sub injection.

4. An exhaust emission control device of an internal combustion engine according to claim 3, further comprising:

an engine speed detecting device the that detects an engine speed;

an engine speed detecting device the that detects an engine load, wherein said concentration control device controls the oxygen concentration by regulating a quantity of fuel injected in the sub injection according to the engine speed and the engine load.

5. An exhaust emission control device of an internal combustion engine according to claim 1, wherein said exhaust emission control device functions as a filter that traps particulate matters included in the exhaust.

6. An exhaust emission control device of an internal combustion engine according to claim 5, wherein said exhaust emission control device functions as an oxidization catalyst.

7. An exhaust emission control device of an internal combustion engine, comprising:

an exhaust emission control device disposed in an exhaust passage of the internal combustion engine and trapping harmful matters in exhaust;

an exhaust flow rate detecting device that detects a flow rate of the exhaust flowing through the exhaust passage; and a concentration control device that controls an oxygen concentration of the exhaust passing through said exhaust emission control device according to the flow rate of the exhaust when said exhaust emission control device is regenerated;

an engine speed detecting device that detects an engine speed; and an engine load detecting device that detects an engine load, wherein said exhaust flow detecting device detects the flow rate of the exhaust according to the engine speed and the engine load.

8. A method of burning diesel particulates trapped by a diesel particulate filter provided in an exhaust passage of an engine, comprising:

detecting a flow rate of exhaust flowing through the exhaust passage;

reducing an amount of oxygen concentration to increase an amount of unburned hydro-carbon (HC) in the exhaust to burn the trapped diesel particulate: and adjusting the amount of oxygen concentration thereafter according to the flow rate of the exhaust to prevent said diesel particulate filter from overheating.

* * * * *